(12) United States Patent
Umemoto et al.

(10) Patent No.: US 9,719,394 B2
(45) Date of Patent: Aug. 1, 2017

(54) EXHAUST PURIFICATION SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Kazuhiro Umemoto, Ebina (JP); Toshihiro Mori, Gotenba (JP); Hiroshi Kobayashi, Susono (JP); Shigeki Nakayama, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/066,164

(22) Filed: Mar. 10, 2016

(65) Prior Publication Data
US 2016/0326930 A1 Nov. 10, 2016

(30) Foreign Application Priority Data
May 8, 2015 (JP) .................... 2015-095852

(51) Int. Cl.
*F01N 3/18* (2006.01)
*F01N 3/20* (2006.01)
(Continued)

(52) U.S. Cl.
CPC .......... *F01N 3/2073* (2013.01); *F01N 3/0814* (2013.01); *F01N 3/0842* (2013.01);
(Continued)

(58) Field of Classification Search
CPC .......... F01N 3/106; F01N 3/108; F01N 3/208; F01N 3/2073; F01N 2240/25; F01N 2430/66
See application file for complete search history.

(56) References Cited

U.S. PATENT DOCUMENTS

2006/0153761 A1* 7/2006 Bandl-Konrad ... B01D 53/9431
  423/239.1
2007/0277507 A1 12/2007 Yan

FOREIGN PATENT DOCUMENTS

JP   2009-540189   11/2009

* cited by examiner

*Primary Examiner* — Jonathan Matthias
(74) *Attorney, Agent, or Firm* — Finnegan, Henderson, Farabow, Garrett & Dunner, LLP

(57) ABSTRACT

In an engine exhaust passage, in order from an exhaust upstream side, an $NO_x$ storage and reduction catalyst, NO oxidation catalyst, $NO_2$ reduction catalyst, and selective reduction catalyst may be arranged. An air-fuel ratio of an exhaust gas which flows into the $NO_x$ storage and reduction catalyst may be temporarily switched to a rich air-fuel ratio which may be adapted for generating ammonia from $NO_x$ which may be stored in the $NO_x$ storage and reduction catalyst. The ammonia, which may be generated by the $NO_x$ storage and reduction catalyst, may be held at the selective reduction catalyst. The $NO_x$ which flows into the selective reduction catalyst may be reduced by the ammonia. The NO oxidation catalyst and $NO_2$ reduction catalyst may be used to make an NO ratio of the exhaust gas which flows into the selective reduction catalyst approach an optimum ratio of the selective reduction catalyst.

12 Claims, 10 Drawing Sheets

(51) Int. Cl.
   *F01N 3/08*    (2006.01)
   *F01N 3/10*    (2006.01)
   *F01N 9/00*    (2006.01)
   *F01N 13/00*   (2010.01)
   *F01N 13/16*   (2010.01)

(52) U.S. Cl.
   CPC .............. *F01N 3/106* (2013.01); *F01N 3/108* (2013.01); *F01N 3/2066* (2013.01); *F01N 9/00* (2013.01); *F01N 13/008* (2013.01); *F01N 13/009* (2014.06); *F01N 13/0097* (2014.06); *F01N 13/16* (2013.01); *F01N 2430/06* (2013.01); *F01N 2560/06* (2013.01); *F01N 2570/14* (2013.01); *F01N 2570/145* (2013.01); *F01N 2570/18* (2013.01); *F01N 2610/03* (2013.01); *F01N 2900/1602* (2013.01); *F01N 2900/1621* (2013.01)

EXHAUST PURIFICATION SYSTEM FOR INTERNAL COMBUSTION ENGINE

RELATED APPLICATIONS

This application claims the benefit of Japanese Application No. 2015-095852 filed May 8, 2015, the entire disclosure of which is incorporated by reference herein.

TECHNICAL FIELD

The present disclosure relates to an exhaust purification system for an internal combustion engine.

BACKGROUND

Existing exhaust purification systems for internal combustion engines may perform combustion under an excess of air, which exhaust purification system is provided with an $NO_x$ storage and reduction catalyst which is arranged in an engine exhaust passage, which $NO_x$ storage and reduction catalyst stores $NO_x$ when an air-fuel ratio of inflowing exhaust gas is lean and releases stored $NO_x$ and reduces the released $NO_x$ to $N_2$ or ammonia when inflowing exhaust gas becomes rich, an oxidation catalyst which is arranged downstream of the $NO_x$ storage and reduction catalyst in the engine exhaust passage, which oxidation catalyst oxidizes part of NO in inflowing exhaust gas to $NO_2$, and a selective reduction catalyst which is arranged downstream of the oxidation catalyst in the engine exhaust passage, which selective reduction catalyst holds ammonia in inflowing exhaust gas and selectively reduces $NO_x$ in the inflowing exhaust gas by ammonia under an oxidizing atmosphere. In some exhaust purification systems, the air-fuel ratio of the exhaust gas which flows into the $NO_x$ storage and reduction catalyst is temporarily switched to a rich air-fuel ratio AFRA which is adapted for generating ammonia from the $NO_x$ which is stored in the $NO_x$ storage and reduction catalyst, whereby an ammonia which is produced by the $NO_x$ storage and reduction catalyst is held by the selective reduction catalyst, after that when the air-fuel ratio of the exhaust gas which flows into the $NO_x$ storage and reduction catalyst is returned to lean, the $NO_x$ in the exhaust gas which flows into the selective reduction catalyst is reduced or purified by the ammonia (for example, see Japanese Patent Publication No. 2009-540189A).

If a ratio of an amount QNO (mol) of NO which is contained in an exhaust gas to a total of the NO amount QNO and an amount $QNO_2$ (mol) of $NO_2$ which is contained in the exhaust gas is referred to as a "NO ratio" (=QNO/(QNO+$QNO_2$)), in a selective reduction catalyst, if the NO ratio of the exhaust gas which flows into the selective reduction catalyst is 0.5, that is, if the amount of NO and amount of $NO_2$ in the exhaust gas which flows into the selective reduction catalyst are equal to each other, a $NO_x$ purification rate of the selective reduction catalyst becomes the highest and as the NO ratio becomes smaller or larger than an optimum ratio which is 0.5, the $NO_x$ purification rate becomes lower. In Japanese Patent Publication No. 2009-540189A, the NO ratio of the exhaust gas which flows out from the $NO_x$ storage and reduction catalyst is considerably high, but the NO ratio is made to fall by the oxidation catalyst and approaches the optimum ratio of the selective reduction catalyst. Therefore, an arrangement of the oxidation catalyst raises the $NO_x$ purification rate of the selective reduction catalyst.

SUMMARY

However, the present disclosure resulted, in part, from determining that if a temperature of the $NO_x$ storage and reduction catalyst becomes considerably high, the NO ratio of the exhaust gas which flows out from the $NO_x$ storage and reduction catalyst becomes low. Therefore, when the temperature of the $NO_x$ storage and reduction catalyst is considerably high, if the NO ratio of the exhaust gas is further lowered due to the oxidation catalyst, the NO ratio of the exhaust gas which flows into the selective reduction catalyst is liable to be excessively lowered. That is, when the catalyst temperature is high, the NO ratio of the exhaust gas which flows into the selective reduction catalyst is liable to separate from the optimum ratio of the selective reduction catalyst and the $NO_x$ purification rate of the selective reduction catalyst is liable to become lower.

According to embodiments of the present disclosure, there may be provided an exhaust purification system for an internal combustion engine where combustion is performed under an excess of air, which exhaust purification system includes: an $NO_x$ storage and reduction catalyst which may be arranged in an engine exhaust passage, which $NO_x$ storage and reduction catalyst may be configured to store $NO_x$ when an air-fuel ratio of exhaust gas which flows into said $NO_x$ storage and reduction catalyst is lean and to release stored $NO_x$ and reduce the released $NO_x$ to $N_2$ or ammonia when the air-fuel ratio of the exhaust gas which flows into said $NO_x$ storage and reduction catalyst becomes rich; an NO oxidation catalyst which may be arranged downstream of said $NO_x$ storage and reduction catalyst in the engine exhaust passage, which NO oxidation catalyst may be configured to oxidize part of NO in the exhaust gas which flows into said NO oxidation catalyst to $NO_2$; an $NO_2$ reduction catalyst which may be arranged downstream of said NO oxidation catalyst in the engine exhaust passage, which $NO_2$ reduction catalyst may be configured to reduce part of the $NO_2$ in the exhaust gas which flows into said $NO_2$ reduction catalyst to NO under an oxidizing atmosphere; a selective reduction catalyst which may be arranged downstream of said $NO_2$ reduction catalyst in the engine exhaust passage, which selective reduction catalyst may be configured to hold ammonia in the exhaust gas which flows into said selective reduction catalyst and to selectively reduce $NO_x$ in the exhaust gas which flows into said selective reduction catalyst by said ammonia under an oxidizing atmosphere; and a controller which may be configured to temporarily switch the air-fuel ratio of the exhaust gas which flows into said $NO_x$ storage and reduction catalyst to a rich air-fuel ratio which may be adapted for producing ammonia from $NO_x$ which is stored in said $NO_x$ storage and reduction catalyst, whereby the ammonia which is produced by said $NO_x$ storage and reduction catalyst may be held by said selective reduction catalyst, and the $NO_x$ in the exhaust gas which flows into said selective reduction catalyst may be reduced by said ammonia after the air-fuel ratio of the exhaust gas which flows into said $NO_x$ storage and reduction catalyst is returned to lean.

Therefore, disclosed embodiments may more reliably purify $NO_x$ regardless of a catalyst temperature.

Embodiments of the present disclosure may be more fully understood from the description of the example embodiments as set forth below, together with the accompanying drawings.

DESCRIPTION OF EMBODIMENTS

Figure 1:
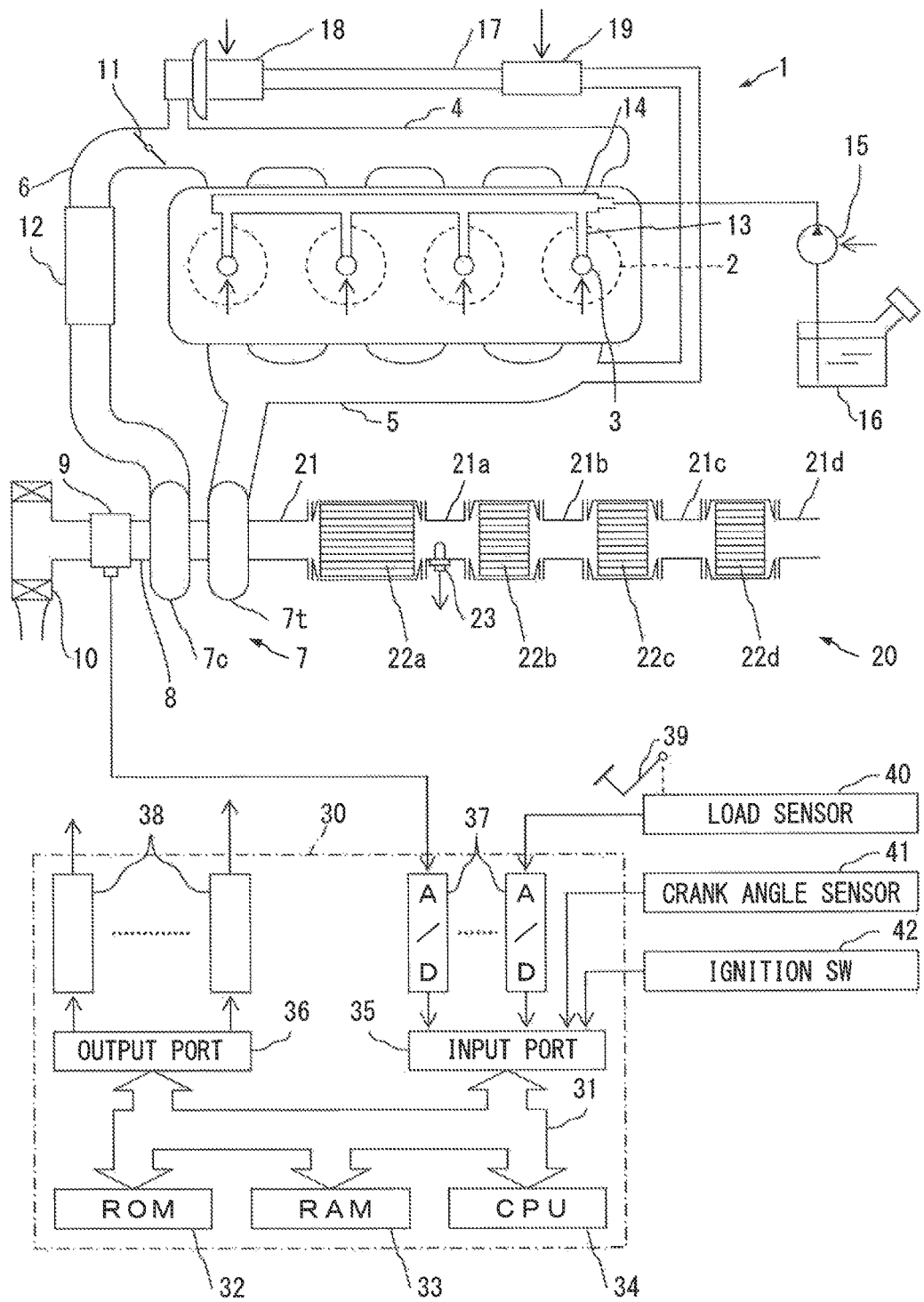
FIG. 1 is an overall view of an internal combustion engine.

FIG. 1 shows a case of application of the present disclosure to a compression ignition type internal combustion engine. In another embodiment (not shown), the present disclosure is applied to a spark ignition type internal combustion engine.

Referring to FIG. 1, 1 indicates an engine body, 2 a combustion chamber of each cylinder, 3 an electromagnetically controlled fuel injector for injecting fuel into each combustion chamber 2, 4 an intake manifold, and 5 an exhaust manifold. The intake manifold 4 is connected through an intake duct 6 to an outlet of a compressor 7c of an exhaust turbocharger 7, while an inlet of the compressor 7c is successively connected through an intake air introduction pipe 8 to an air flow meter 9 and an air cleaner 10. Inside the intake duct 6, an electrical control type throttle valve 11 is arranged. Furthermore, around the intake duct 6, a cooling device 12 is arranged for cooling the intake air which flows through an inside of the intake duct 6. On the other hand, the exhaust manifold 5 is connected to an inlet of an exhaust turbine 7t of the exhaust turbocharger 7. An outlet of the exhaust turbine 7t is connected to an exhaust post-treatment device 20.

Each fuel injector 3 is connected through a fuel feed tube 13 to a common rail 14. This common rail 14 is connected through an electrical control type of variable discharge fuel pump 15 to a fuel tank 16. The fuel inside the fuel tank 16 is fed by the fuel pump 15 to a common rail 14. The fuel which is fed to an inside of the common rail 14 is fed through each fuel feed tube 13 to the fuel injector 3. Note that, the common rail 14 has a fuel pressure sensor (not shown) which detects a fuel pressure inside the common rail 14 attached to it. An amount of fuel discharge of the fuel pump 15 is controlled based on a signal from the fuel pressure sensor so that the fuel pressure inside the common rail 14 matches a target pressure.

The exhaust manifold 5 and the intake manifold 4 are connected with each other through an exhaust gas recirculation (below, referred to as "EGR") passage 17. Inside the EGR passage 17, an electrical control type EGR control valve 18 is arranged. Further, around the EGR passage 17, a cooling device 19 is arranged for cooling an EGR gas which flows through an inside of the EGR passage 17.

The exhaust post-treatment device 20 comprises an exhaust pipe 21 which is connected to the outlet of the exhaust turbine 7t. This exhaust pipe 21 is connected to an inlet of an $NO_x$ storage and reduction catalyst 22a. An outlet of the $NO_x$ storage and reduction catalyst 22a is connected through an exhaust pipe 21a to an inlet of an NO oxidation catalyst 22b. An outlet of the NO oxidation catalyst 22b is connected through an exhaust pipe 21b to an inlet of an $NO_2$ reduction catalyst 22c. An outlet of the $NO_2$ reduction catalyst 22c is connected through an exhaust pipe 21c to a selective reduction catalyst 22d. An outlet of the selective reduction catalyst 22d is connected to an exhaust pipe 21d.

Controller 30 (e.g., an electronic control unit (ECU)) is comprised of a digital computer provided with components which are connected with each other by a bidirectional bus 31 such as a ROM (read only memory) 32, a RAM (random access memory) 33, a CPU (microprocessor) 34, an input port 35, and an output port 36. Controller 30 may be programmed to perform disclosed functions. At the exhaust pipe 21a, a temperature sensor 23 for detecting a temperature of an exhaust gas which flows out from the $NO_x$ storage and reduction catalyst 22a is attached. The temperature of the exhaust gas which flows out from the $NO_x$ storage and reduction catalyst 22a expresses a temperature of the $NO_x$ storage and reduction catalyst 22a. Output voltages of the air flow meter 9 and temperature sensor 23 are input through respectively corresponding AD converters 37 to the input port 35. Further, at an accelerator pedal 39, a load sensor 40 is connected which generates an output voltage which is proportional to an amount of depression of the accelerator pedal 39. An output voltage of the load sensor 40 is input through a corresponding AD converter 37 to the input port 35. Further, a crank angle sensor 41 which generates an output pulse each time a crankshaft rotates for example 30 degrees is connected to the input port 35. In the CPU 34, the output pulses from the crank angle sensor 41 are used as the basis to calculate the engine speed. Furthermore, an output pulse which expresses turning on or off of an ignition switch 42 is connected to the input port 35. The ignition switch 42 is operated by a vehicle operator. On the other hand, the output port 36 is connected through corresponding drive circuits 38 to the fuel injectors 3, drive device of the throttle valve 11, fuel pump 15, and EGR control valve 18.

Figure 2A:
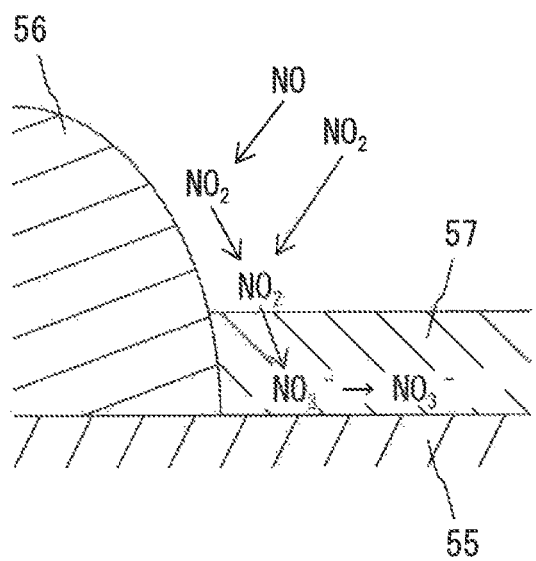
FIG. 2A is a cross-sectional view of a surface part of a catalyst carrier of an $NO_x$ storage and reduction catalyst.
Figure 2B:
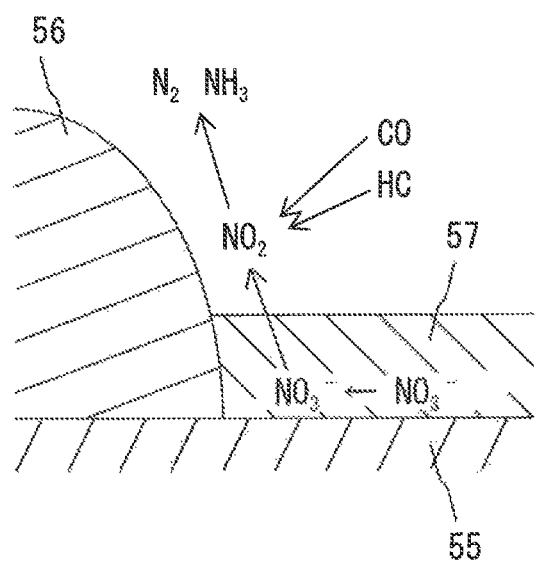
FIG. 2B is a cross-sectional view of a surface part of a catalyst carrier of an $NO_x$ storage and reduction catalyst.

The $NO_x$ storage and reduction catalyst 22a forms a honeycomb structure and is provided with a plurality of exhaust flow passages which are separated from each other by thin substrates. The substrates of the $NO_x$ storage and reduction catalyst 22a carry catalyst carriers 55 comprised of, for example, alumina. FIG. 2A and FIG. 2B illustrate cross-sections of a surface part of the catalyst carrier. As shown in FIG. 2A and FIG. 2B, a surface of the catalyst carrier 55 carries a precious metal catalyst 56 dispersed. Furthermore, the surface of the catalyst carrier 55 is formed with a basicity layer 57.

In this embodiment according to the present disclosure, as the precious metal catalyst 56, at least one element selected from platinum Pt, rhodium Rh, and palladium Pd is used. As the ingredient which forms the basicity layer 57, for example, at least one selected from potassium K, sodium Na, and cesium Cs or other such alkali metals, barium Ba and calcium Ca and other such alkali earths, lanthanoids and other rare earths, and silver Ag, copper Cu, iron Fe, and iridium Ir and other such metals which can donate electrons to $NO_x$ is used.

If referring to a ratio of an air and fuel which are supplied to an intake passage, combustion chamber 2, and exhaust passage upstream from a certain position in the exhaust passage as an air-fuel ratio of the exhaust gas at that position and using the term "storage" as a term including both absorption and adsorption, the basicity layer 57 performs an $NO_x$ storage and release action in which it stores $NO_x$ when the air-fuel ratio of an inflowing exhaust gas is lean and releases the stored $NO_x$ when a concentration of oxygen in the inflowing exhaust gas falls.

That is, explaining this taking as an example a case of using platinum Pt as the precious metal catalyst 56 and of using barium Ba as the ingredient forming the basicity layer 57, when the air-fuel ratio of the inflowing exhaust gas is lean, that is, when the concentration of oxygen of the inflowing exhaust gas is high, NO which is contained in the inflowing exhaust gas, as shown in FIG. 2A, is oxidized on the platinum 56 to become $NO_2$. The thus produced $NO_2$ and the $NO_2$ in the inflowing exhaust gas next are given electrons from the platinum 56 and become $NO_2^-$. This $NO_2^-$ next disperses in the basicity layer 57 in the form of nitric acid ions $NO_3^-$ and becomes nitrates. In this way, $NO_x$ is absorbed in the basicity layer 57 in the form of nitrates. Note that, sometimes NO and $NO_2$ are temporarily held by adsorption on the basicity layer 57.

On the other hand, when $NO_x$ is absorbed in the basicity layer 57 in the form of nitrates, if the air-fuel ratio of the inflowing exhaust gas becomes rich, the concentration of oxygen of the inflowing exhaust gas falls, so the reaction proceeds in the opposite direction ($NO_3^- \rightarrow NO_2$) and therefore, as shown in FIG. 2B, the nitric acid ions $NO_3^-$ in the basicity layer 57 is released from the basicity layer 57 in the form of $NO_2$. Next, the released $NO_2$ is reduced by a reducing agent which is contained in the inflowing exhaust gas, for example, HC, CO, and $H_2$.

Figure 3:
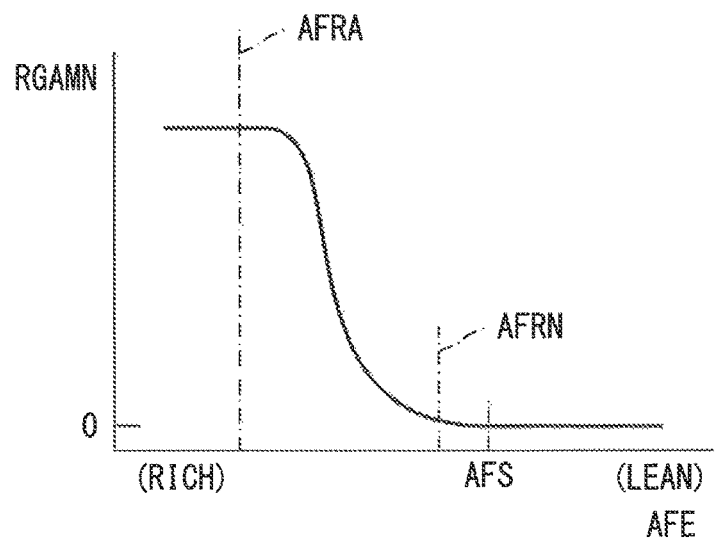
FIG. 3 is a graph which shows a relationship between an air-fuel ratio AFE of exhaust gas which flows into an $NO_x$ storage and reduction catalyst and an $NH_3$ generation rate RGAMN of the $NO_x$ storage and reduction catalyst.

In this case, the $NO_x$ which is released from the basicity layer 57 is reduced to nitrogen $N_2$ or ammonia $NH_3$ in accordance with a rich degree of the air-fuel ratio of the exhaust gas which flows into the $NO_x$ storage and reduction catalyst 22a. FIG. 3 shows a relationship between an air-fuel ratio AFE of the exhaust gas which flows into the $NO_x$ storage and reduction catalyst 22a and an $NH_3$ generation rate RGAMN of the $NO_x$ storage and reduction catalyst 22a. The $NH_3$ generation rate RGAMN of the $NO_x$ storage and reduction catalyst 22a is defined as a ratio of an amount QAMN (mol) of $NH_3$ which is generated from $NO_x$ which is released from the basicity layer 57 with respect to an amount QNOXR (mol) of $NO_x$ which is released from the basicity layer 57 (RGAMN=QAMN/QNOXR). Note that, in FIG. 3, AFS shows a stoichiometric air-fuel ratio (=14.6). As shown in FIG. 3, as the air-fuel ratio AFE of the inflowing exhaust gas becomes smaller, that is, as the rich degree of the air-fuel ratio AFE of the inflowing exhaust gas becomes high, the $NH_3$ generation rate RGAMN becomes high.

That is, if the air-fuel ratio AFE of the exhaust gas which flows into the $NO_x$ storage and reduction catalyst 22a is made a rich air-fuel ratio AFRN with a relatively small rich degree, the $NH_3$ generation rate RGAMN becomes lower and, therefore, almost all of the $NO_x$ which is released from the basicity layer 57 is reduced to $N_2$. Therefore, the rich air-fuel ratio AFRN can be said to be a rich air-fuel ratio which is adapted for reducing the $NO_x$ which is stored in the $NO_x$ storage and reduction catalyst 22a to $N_2$. This rich air-fuel ratio AFRN is for example 13.0 or so. As opposed to this, if the air-fuel ratio AFE of the exhaust gas which flows into the $NO_x$ storage and reduction catalyst 22a is made a rich air-fuel ratio AFRA with a relatively large rich degree, the $NH_3$ generation rate RGAMN becomes higher and, therefore, almost all of the $NO_x$ which is released from the basicity layer 57 is reduced to $NH_3$. Therefore, the rich air-fuel ratio AFRA can be said to be a rich air-fuel ratio AFRA which is adapted for generating ammonia from the $NO_x$ which is stored in the $NO_x$ storage and reduction catalyst 22a. This rich air-fuel ratio AFRA is for example 12.0 or so. In this way, the $NO_x$ storage and reduction catalyst 22a is configured to store $NO_x$ when the air-fuel ratio of the inflowing exhaust gas is lean and to release the stored $NO_x$ and to reduce the released $NO_x$ to $N_2$ or ammonia when the air-fuel ratio of the inflowing exhaust gas becomes rich.

On the other hand, the NO oxidation catalyst 22b is configured to oxidize part of an NO in the exhaust gas which flows into the NO oxidation catalyst 22b to $NO_2$. The NO oxidation catalyst 22b also forms a honeycomb structure and is provided with exhaust flow passages which are separated from each other by thin substrates. The substrates of the NO oxidation catalyst 22b carry catalyst carriers comprised of, for example, alumina. On the catalyst carrier, a precious metal catalyst which is comprised of at least one element selected from platinum Pt, rhodium Rh, and palladium Pd is carried. Note that the NO oxidation catalyst 22b is not provided with almost any $NO_2$ reducing ability.

Further, the $NO_2$ reduction catalyst 22c is configured to reduce part of the $NO_2$ in the exhaust gas which flows into the $NO_2$ reduction catalyst 22c to NO under an oxidizing atmosphere. The $NO_2$ reduction catalyst 22c also forms a honeycomb structure and is provided with a plurality of exhaust flow passages which are separated from each other by thin substrates. The substrates of the $NO_2$ reduction catalyst 22c carry catalyst carriers comprised of, for example, alumina, and the catalyst carriers carry a basic catalyst which is comprised of at least one element selected from potassium K and lithium Li. Note that the $NO_2$ reduction catalyst 22c is not provided with almost any NO oxidizing ability at all.

The selective reduction catalyst 22d is configured to hold an ammonia $NH_3$ in the exhaust gas which flows into the selective reduction catalyst 22d and selectively reduce an $NO_x$ in the exhaust gas which flows into the selective reduction catalyst 22d by the ammonia $NH_3$ under an oxidizing atmosphere. In this case, it is believed that the ammonia is held at the selective reduction catalyst 22d by adsorption. The selective reduction catalyst 22d also forms a honeycomb structure and is provided with a plurality of exhaust flow passages which are separated from each other by thin substrates. The substrates of the selective reduction catalyst 22d carry catalyst carriers which are comprised of, for example, titania $TiO_2$, and the catalyst carriers carry vanadium oxide $V_2O_5$. Alternatively, the substrates of the selective reduction catalyst 22d carry a catalyst carriers which are comprised of, for example, zeolite, and the catalyst carriers carry copper Cu.

Now, in this embodiment according to the present disclosure, usually combustion is performed under an excess of air. In this case, the air-fuel ratio of the exhaust gas which flows into the $NO_x$ storage and reduction catalyst 22a is lean, so at this time, an $NO_x$ in the exhaust gas which flows into the $NO_x$ storage and reduction catalyst 22a is stored in the $NO_x$ storage and reduction catalyst 22a. However, if the engine operation continues, an $NO_x$ storage amount of the $NO_x$ storage and reduction catalyst 22a becomes greater. Finally, the $NO_x$ storage and reduction catalyst 22a ends up no longer able to store $NO_x$. Therefore, in this embodiment according to the present disclosure, before the $NO_x$ storage and reduction a catalyst 22a is saturated by the $NO_x$, the air-fuel ratio of the exhaust gas which flows into the $NO_x$ storage and reduction catalyst 22a is temporarily switched to rich to thereby release $NO_x$ from the $NO_x$ storage and reduction catalyst 22a and to reduce or purify $N_2$. As a result, the $NO_x$ storage amount of the $NO_x$ storage and reduction catalyst 22a is decreased and an amount of $NO_x$ which the $NO_x$ storage and reduction catalyst 22a can store is restored.

Figure 4:
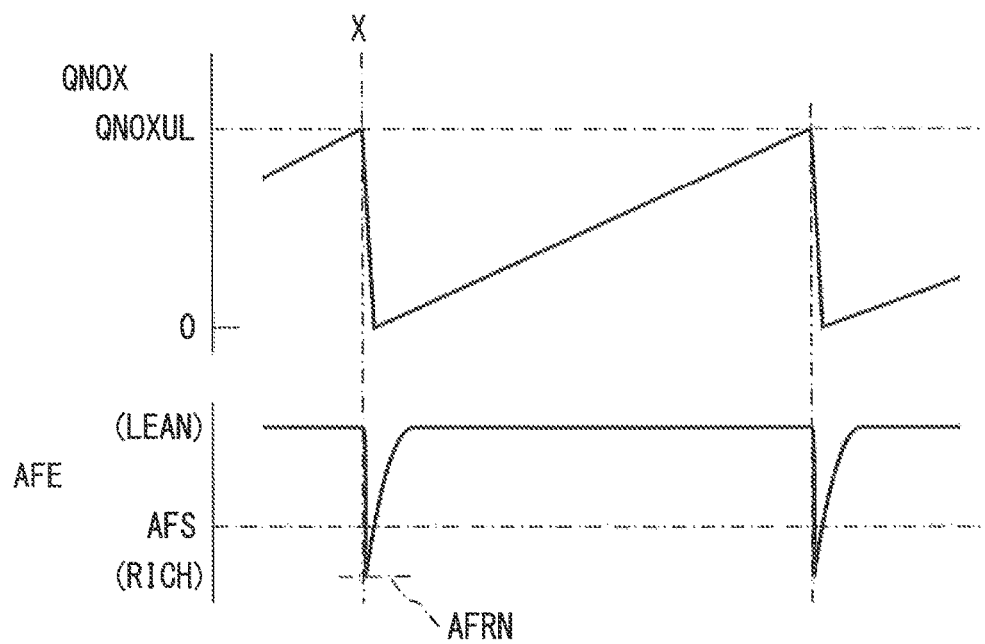
FIG. 4 is a time chart which explains storage and reduction processing.

That is, as shown in FIG. 4 by X, if an amount QNOX of $NO_x$ stored in the $NO_x$ storage and reduction catalyst 22a exceeds an upper limit amount QNOXUL, the air-fuel ratio AFE of the exhaust gas which flows into the $NO_x$ storage and reduction catalyst 22a is temporarily switched to the rich air-fuel ratio AFRN which is adapted for reducing $NO_x$ to $N_2$. As a result, substantially all of the $NO_x$ which is stored in the $NO_x$ storage and reduction catalyst 22a is released, and the $NO_x$ storage amount QNOX of the $NO_x$ storage and reduction catalyst 22a is returned to zero. In this way, switching of the air-fuel ratio AFE of the inflowing exhaust gas to rich is repeatedly performed at certain time intervals. The $NO_x$ storage ability of the $NO_x$ storage and reduction catalyst 22a is thus restored repeatedly.

In this embodiment according to the present disclosure, to make the air-fuel ratio AFE of the exhaust gas which flows into the $NO_x$ storage and reduction catalyst 22a rich, additional fuel is injected in addition to the fuel for engine output from the fuel injector 3 to an inside of the combustion chamber 2. This additional fuel is injected at a timing where it burns, but does not contribute to engine output, that is, for example slightly before ATDC90° after compression top dead center. In another embodiment (not shown), the air-fuel ratio AFE of the exhaust gas which flows into the $NO_x$ storage and reduction catalyst 22a is made rich, by injecting additional fuel (hydrocarbons) upstream of the $NO_x$ storage and reduction catalyst 22a inside the exhaust passage. Whatever the case, an amount of additional fuel is set so that the $NO_x$ storage amount QNOX of the $NO_x$ storage and reduction catalyst 22a becomes substantially zero.

Figure 5:
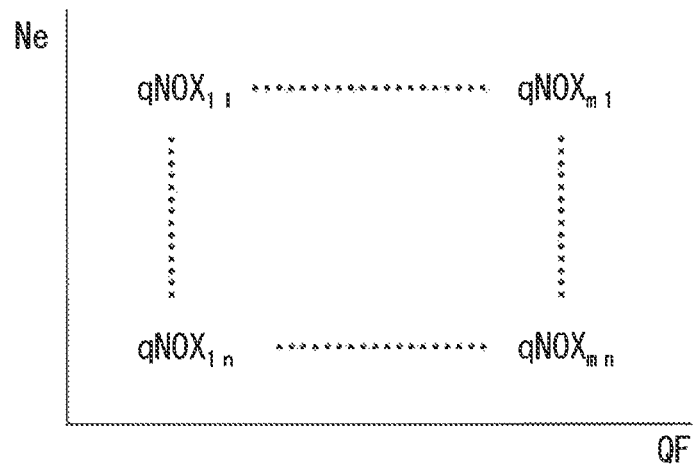
FIG. 5 is a view which shows a map of an amount qNOX of $NO_x$ which is stored in an $NO_x$ storage and reduction catalyst per unit time.

Further, in this embodiment according to the present disclosure, the $NO_x$ storage amount QNOX of the $NO_x$ storage and reduction catalyst 22a is calculated by cumulatively adding an amount qNOX of $NO_x$ which is stored in the $NO_x$ storage and reduction catalyst 22a per unit time when the air-fuel ratio AFE of the exhaust gas which flows into the $NO_x$ storage and reduction catalyst 22a is lean (QNOX=QNOX+qNOX). The amount qNOX of $NO_x$ which is stored in the $NO_x$ storage and reduction catalyst 22a per unit time is equal to an amount of $NO_x$ which flows into the $NO_x$ storage and reduction catalyst 22a per unit time and is stored as a function of an engine operating state, for example, an amount of fuel QF for the engine output expressing the engine load and an engine speed Ne in the form of a map such as shown in FIG. 5 in advance in the ROM 32.

A processing for reducing $NO_x$ by temporarily switching the air-fuel ratio AFE of the exhaust gas which flows into the $NO_x$ storage and reduction catalyst 22a in this way to the rich air-fuel ratio AFRN which is adapted for reducing the $NO_x$ which is stored in the $NO_x$ storage and reduction catalyst 22a to $N_2$ will below be referred to as a "storage and reduction processing".

Figure 6:
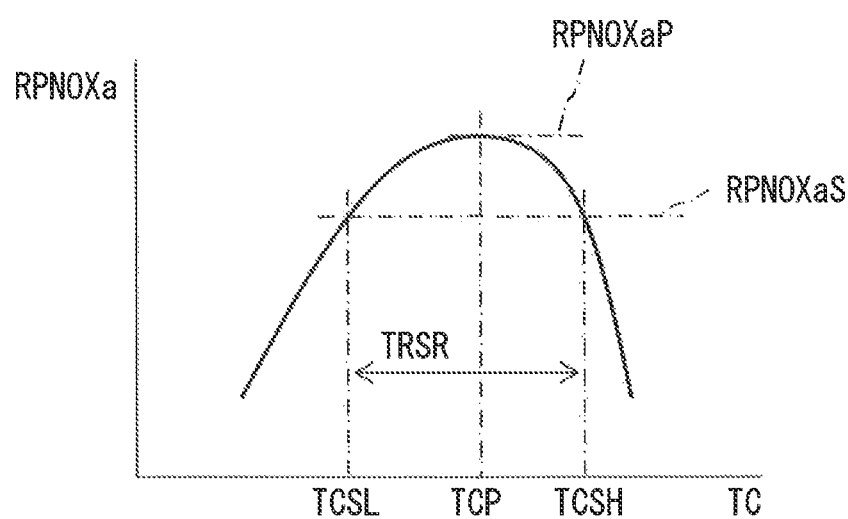
FIG. 6 is a graph which shows a relationship between an $NO_x$ purification rate RPNOXa of an $NO_x$ storage and reduction catalyst and a catalyst temperature TC when storage and reduction processing is being performed.

FIG. 6 shows a relationship between a $NO_x$ purification rate RPNOXa of the $NO_x$ storage and reduction catalyst 22a and a catalyst temperature TC which is a temperature of the $NO_x$ storage and reduction catalyst 22a when the storage and reduction processing is performed. Note that, if expressing a total amount (mol) of $NO_x$ which flows into the $NO_x$ storage and reduction catalyst 22a within a constant time period longer than the time interval at which the action of switching the air-fuel ratio of the inflowing exhaust gas AFE to rich by QNOXain and expressing a total amount (mol) of $NO_x$ which flows out from the NO storage and reduction catalyst 22a in that constant time period by QNOXaout, the $NO_x$ purification rate RPNOXa of the $NO_x$ storage and reduction catalyst 22a is calculated using the following formula:

$$RPNOXa=(QNOXain-QNOXaout)/QNOXain$$

Referring to FIG. 6, if the catalyst temperature TC is low, the $NO_x$ purification rate RPNOXa rises as the catalyst temperature TC becomes higher. If the catalyst temperature TC becomes further higher and reaches a peak temperature TCP, the $NO_x$ purification rate RPNOXa reaches a peak value RPNOXaP. If the catalyst temperature TC becomes further higher, the $NO_x$ purification rate RPNOXa falls. That is, the $NO_x$ purification rate RPNOXa falls as the catalyst temperature TC falls from the peak temperature TCP and falls as the catalyst temperature TC rises from the peak temperature TCP.

The $NO_x$ purification rate RPNOXa falls as the catalyst temperature TC falls from the peak temperature TCP mainly because, as the catalyst temperature TC falls from the peak temperature TCP, an NO in the exhaust gas which flows into the $NO_x$ storage and reduction catalyst 22a becomes harder to oxidize to $NO_2$ and $NO_x$ becomes harder to be absorbed at the basicity layer 57. On the other hand, the $NO_x$ purification rate RPNOXa falls as the catalyst temperature TC rises from the peak temperature TCP mainly because thermal decomposition of the nitrates in the basicity layer 57 is promoted as the catalyst temperature TC rises from the peak temperature TCP. That is, if the nitrates in the basicity layer 57 are thermally decomposed, $NO_x$ is released from the basicity layer 57 in the form of NO. At this time, the exhaust gas which flows into the $NO_x$ storage and reduction catalyst 22a does not contain HC, CO, etc. much at all, so the released NO flows out from the $NO_x$ storage and reduction catalyst 22a without being reduced.

Furthermore, referring to FIG. 6, when the catalyst temperature TC is in a storage and reduction temperature range TRSR from a low temperature side set temperature TCSL to a high temperature side set temperature TCSH, the $NO_x$ purification rate RPNOXa is equal to or higher than a predetermined set $NO_x$ purification rate RPNOXaS. On the other hand, when the catalyst temperature TC is lower than the low temperature side set temperature TCSL and higher than the high temperature side set temperature TCSH, the $NO_x$ purification rate RPNOXa is lower than the set $NO_x$ purification rate RPNOXaS. Therefore, when the $NO_x$ purification rate RPNOXa is low, even if performing storage and reduction catalyst processing, that is, even if injecting additional fuel so as to switch the air-fuel ratio AFE of the exhaust gas which flows into the $NO_x$ storage and reduction catalyst 22a to rich, the additional fuel cannot be effectively utilized for reducing the $NO_x$.

Therefore, in this embodiment according to the present disclosure, when the catalyst temperature TC is in the storage and reduction temperature range TRSR, storage and reduction processing is performed while when the catalyst temperature TC is outside the storage and reduction temperature range TRSR, the storage and reduction processing is not performed. As a result, it is possible to effectively utilize the fuel while more reliably reducing $NO_x$. Note that the low temperature side set temperature TCSL is for example 200° C. or so. On the other hand, the high temperature side set temperature TCSH is for example 350° C. or so. In another embodiment (not shown), the high temperature side set temperature TCSH is set to a temperature higher than the above-mentioned peak temperature TCP.

In this way, when the catalyst temperature TC is in the storage and reduction temperature range TRSR, storage and reduction processing is used to reduce the $NO_x$. As opposed to this, when the catalyst temperature TC is higher than the high temperature side set temperature TCSH, in this embodiment according to the present disclosure, the $NO_x$ is reduced in the following way. That is, when the catalyst temperature TC rises beyond the high temperature side set temperature TCSH, the air-fuel ratio AFE of the exhaust gas which flows into the $NO_x$ storage and reduction catalyst 22a is temporarily switched to the rich air-fuel ratio AFRA which is adapted for generating ammonia from the $NO_x$ which is stored in the $NO_x$ storage and reduction catalyst 22a. As a result, the $NO_x$ storage ability of the $NO_x$ storage and reduction catalyst 22a is restored and ammonia is produced from substantially all of the $NO_x$ which is stored in the $NO_x$ storage and reduction catalyst 22a. This ammonia flows out from the $NO_x$ storage and reduction catalyst 22a, then flows into the selective reduction catalyst 22d, and then is held in the selective reduction catalyst 22d.

After that, that is, when the air-fuel ratio AFE of the exhaust gas which flows into the $NO_x$ storage and reduction catalyst 22a is returned to lean and the temperature of the $NO_x$ storage and reduction catalyst is higher than the high temperature side set temperature TCSH, the $NO_x$ which flows out from the $NO_x$ storage and reduction catalyst 22a next flows into the selective reduction catalyst 22d. In this embodiment according to the present disclosure, the air-fuel ratio of the exhaust gas which flows into the NO oxidation catalyst 22b, $NO_2$ reduction catalyst 22c, and selective reduction catalyst 22d matches the air-fuel ratio AFE of the exhaust gas which flows into the $NO_x$ storage and reduction catalyst 22a. Therefore, the $NO_x$ which flows into the selective reduction catalyst 22d at this time is reduced by the ammonia which is held in the selective reduction catalyst 22d under an oxidizing atmosphere.

If $NO_x$ is reduced by ammonia in the selective reduction catalyst 22d, the amount of ammonia which is held in the selective reduction catalyst 22d is gradually decreased. So long as the selective reduction catalyst 22d holds ammonia, the selective reduction catalyst 22d reduces the $NO_x$. Note that, an amount of ammonia which is produced when the air-fuel ratio AFE of the exhaust gas which flows into the $NO_x$ storage and reduction catalyst 22a is temporarily switched to the rich air-fuel ratio AFRA, that is, an initial amount of ammonia which is held in the selective reduction catalyst 22d, can fluctuate depending on the $NO_x$ storage amount of the $NO_x$ storage and reduction catalyst 22a when the air-fuel ratio of the inflowing exhaust gas AFE is switched to the rich air-fuel ratio AFRA.

Furthermore, in this embodiment according to the present disclosure, even when a signal to stop engine operation is issued, that is, for example, when the ignition switch 42 is turned off, the air-fuel ratio AFE of the exhaust gas which flows into the $NO_x$ storage and reduction catalyst 22a is temporarily switched to the rich air-fuel ratio AFRA which is adapted for generating ammonia from the $NO_x$ which is stored in the $NO_x$ storage and reduction catalyst 22a. As a result, the $NO_x$ storage ability of the $NO_x$ storage and reduction catalyst 22a is restored and ammonia is produced from substantially all of the $NO_x$ which is stored in the $NO_x$ storage and reduction catalyst 22a. This ammonia next flows into the selective reduction catalyst 22d and is held therein. Next, the engine operation is stopped.

While engine operation is stopped, the ammonia continues to be held in the selective reduction catalyst 22d. Next, when the engine operation is restarted and the catalyst temperature TC rises beyond the low temperature side set temperature TCSL, that is, when the catalyst temperature TC becomes within the storage and reduction temperature range TCSR, the above-mentioned storage and reduction processing is started whereby the $NO_x$ is reduced. On the other hand, while the catalyst temperature TC is lower than the low temperature side set temperature TCSL, storage and reduction processing is not performed. In this case, the $NO_x$ which passes through the $NO_x$ storage and reduction catalyst 22a flows into the selective reduction catalyst 22d. At this time, if the selective reduction catalyst 22d is activated, the $NO_x$ is reduced by the ammonia which is held in the selective reduction catalyst 22d.

Figure 7:
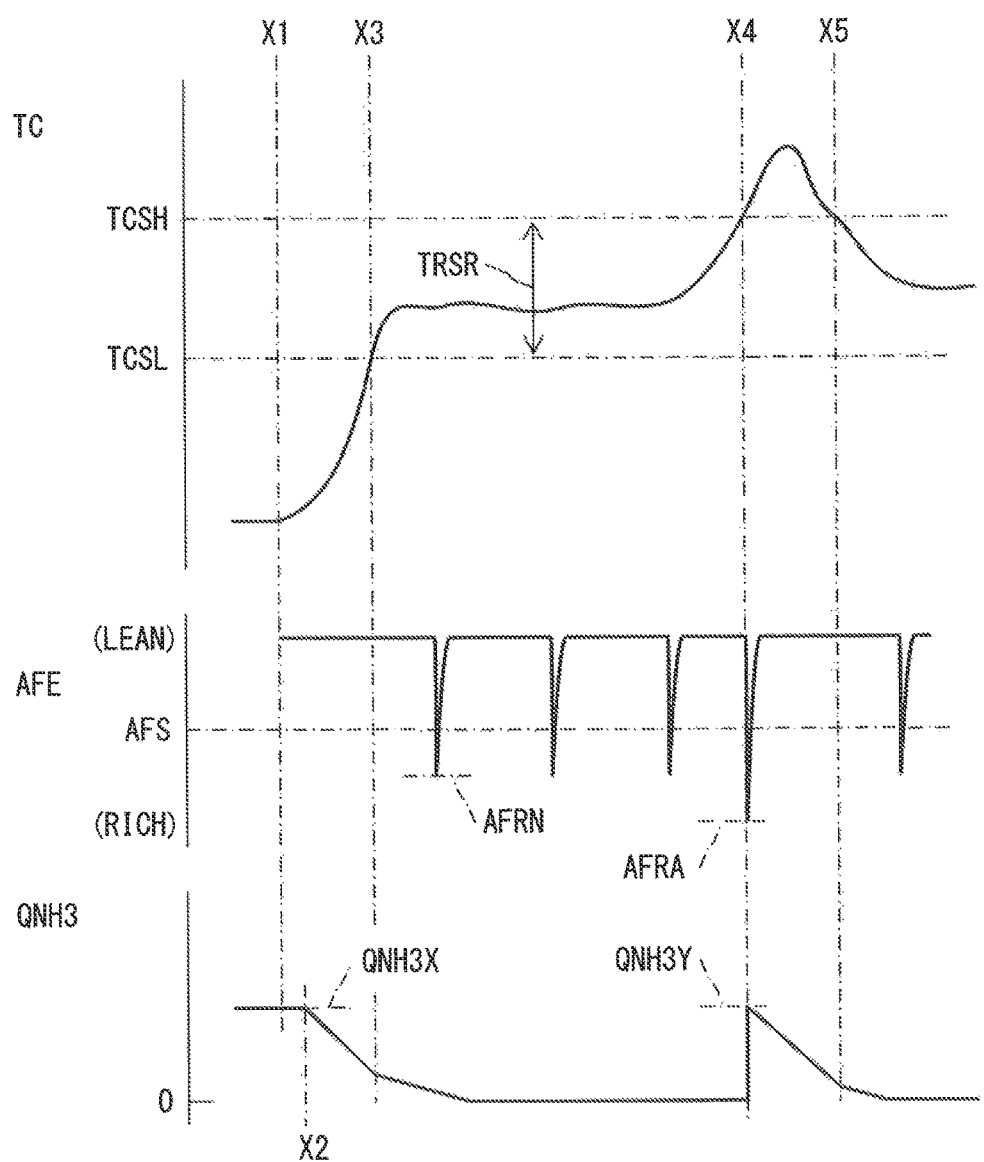
FIG. 7 is a time chart which shows variations in a catalyst temperature TC, air-fuel ratio AFE of exhaust gas which flows into an $NO_x$ storage and reduction catalyst, and amount QNH3 of held ammonia of a selective reduction catalyst.

That is, in FIG. 7, X1 shows a timing at which engine operation is started. At this time, an amount QNH3 of ammonia held in the selective reduction catalyst 22d is an amount QNH3X. If engine operation is started, the catalyst temperature TC gradually rises. The temperature of the selective reduction catalyst 22d similarly rises. Next, if the selective reduction catalyst 22d is activated, the $NO_x$ in the inflowing exhaust gas is reduced by the ammonia which is held in the selective reduction catalyst 22d. Therefore, as shown in FIG. 7 by X2, the amount QNH3 of ammonia held in the selective reduction catalyst 22d starts to be gradually decreased.

Next, as shown in FIG. 7 by X3, if the catalyst temperature TC rises beyond the low temperature side set temperature TCSL, that is, if the catalyst temperature TC becomes within the storage and reduction temperature range TRSR, the storage and reduction processing is started. That is, the air-fuel ratio AFE of the exhaust gas which flows into the $NO_x$ storage and reduction catalyst 22a is repeatedly temporarily switched to the rich air-fuel ratio AFRN at certain time intervals. So long as the catalyst temperature TC is within the storage and reduction temperature range TRSR, the storage and reduction processing is performed.

Next, as shown by X4, if the catalyst temperature TC rises beyond the high temperature side set temperature TCSH, the air-fuel ratio AFE of the exhaust gas which flows into the $NO_x$ storage and reduction catalyst 22a is temporarily switched to the rich air-fuel ratio AFRA. As a result, the amount QNH3 of ammonia held in the selective reduction catalyst 22d is increased to an initial amount QNH3Y. So long as the catalyst temperature TC is outside of the storage and reduction temperature range TRSR, the storage and reduction processing is stopped, therefore the air-fuel ratio AFE of the exhaust gas which flows into the $NO_x$ storage and reduction catalyst 22a is maintained lean. In this case, $NO_x$ reaches the selective reduction catalyst 22d and is reduced by the ammonia which is held in the selective reduction catalyst 22d. As a result, the amount QNH3 of ammonia held in the selective reduction catalyst 22d is gradually decreased.

Next, as shown in FIG. 7 by X5, if the catalyst temperature TC falls below the high temperature side set temperature TCSH, that is, if the catalyst temperature TC returns to the storage and reduction temperature range TRSR, the storage and reduction processing is restarted. Note that, in the example which is shown in FIG. 7, as shown by X3 and X5, ammonia remains in the selective reduction catalyst 22d at the time when the storage and reduction processing is started. This remaining ammonia is used for reducing the $NO_x$ which flows out from the $NO_x$ storage and reduction catalyst 22a at the time of storage and reduction processing. As a result, the amount QNH3 of ammonia held in the selective reduction catalyst 22d is gradually decreased to zero. Further, as will be understood from FIG. 3, even when the air-fuel ratio AFE of the exhaust gas which flows into the $NO_x$ storage and reduction catalyst 22a is temporarily switched to the rich air-fuel ratio AFRN at the time of storage and reduction processing, a small amount of ammonia is produced at the $NO_x$ storage and reduction catalyst 22a. This ammonia next flows into the selective reduction catalyst 22d and is held therein. This ammonia is used to reduce the $NO_x$ which passes through the $NO_x$ storage and reduction catalyst 22a after that. In this way, in this embodiment according to the present disclosure, $NO_x$ can be reliably reduced over a broad range of the catalyst temperature TC.

Figure 8:
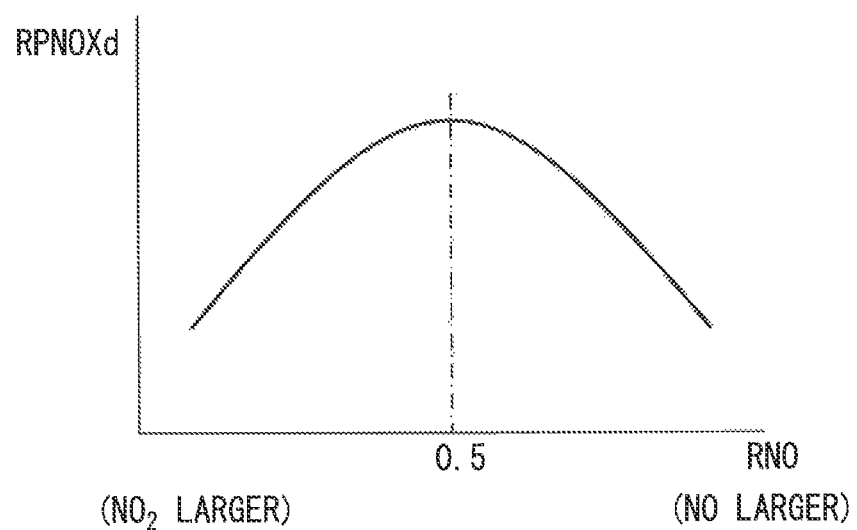
FIG. 8 is a graph which shows a relationship between an $NO_x$ purification rate PRNOXd of a selective reduction catalyst and an NO ratio RNO of exhaust gas which flows into the selective reduction catalyst.

As explained above, when the catalyst temperature TC is higher than the high temperature side set temperature TCSH, $NO_x$ is reduced by the ammonia which is held in the selective reduction catalyst 22d. In this regard, if referring to a ratio of an amount QNO of NO which is contained in the exhaust gas to a total of the amount QNO (mol) of NO and amount $QNO_2$ (mol) of $NO_2$ which are contained in the exhaust gas as a NO ratio (=$QNO/(QNO+QNO_2)$), the $NO_x$ purification rate of the selective reduction catalyst 22d fluctuates in accordance with the NO ratio of the exhaust gas which flows into the selective reduction catalyst 22d. That is, as shown in FIG. 8, when the NO ratio RNO of the exhaust gas which flows into the selective reduction catalyst 22d is an optimum ratio of 0.5, that is, when the amount of NO and the amount of $NO_2$ which flow into the selective reduction catalyst 22d are substantially equal to each other, the $NO_x$ purification rate RPNOXd of the selective reduction catalyst 22d is the highest. Further, as the NO ratio RNO separates from the optimum ratio (0.5) of the selective reduction catalyst 22d, that is, as the NO ratio RNO becomes smaller than or becomes larger than the optimum ratio (0.5) of the selective reduction catalyst 22d, the $NO_x$ purification rate RPNOXd of the selective reduction catalyst 22d becomes lower. In other words, as an absolute value of a difference of the NO ratio RNO from the optimum ratio (0.5) of the selective reduction catalyst 22d, that is, as a NO ratio difference (=|RNO−0.5|), becomes smaller, the $NO_x$ purification rate RPNOXd of the selective reduction catalyst 22d becomes higher. This is known as a "fast reaction". Therefore, to purify $NO_x$ well in the selective reduction catalyst 22d, it is necessary to make the NO ratio RNO of the exhaust gas which flows into the selective reduction catalyst 22d approach the optimum ratio (0.5) of the selective reduction catalyst 22d, that is, to make the NO ratio difference smaller.

In general, an exhaust gas which is discharged from the engine body 1, that is, an exhaust gas which flows into the $NO_x$ storage and reduction catalyst 22a, contains more NO than $NO_2$. Therefore, the NO ratio RNO of the exhaust gas which flows into the $NO_x$ storage and reduction catalyst 22a is relatively high. Further, as explained above referring to FIG. 6, when the catalyst temperature TC is higher than the peak temperature TCP, in particular the high temperature side set temperature TCSH, thermal decomposition of the nitrates in the $NO_x$ storage and reduction catalyst 22a is promoted. In this case, part of the $NO_2$ in the exhaust gas which flows into the $NO_x$ storage and reduction catalyst 22a is stored once in the $NO_x$ storage and reduction catalyst 22a to become nitrates. These nitrates are broken down by heat whereby NO is discharged. Therefore, when the catalyst temperature TC is high, it can be deemed that the $NO_x$ storage and reduction catalyst 22a causes the $NO_2$ in the inflowing exhaust gas to be transformed to NO. Therefore, the NO ratio of the exhaust gas which flows out from the $NO_x$ storage and reduction catalyst 22a is further higher than the NO ratio of the exhaust gas which flows into the $NO_x$ storage and reduction catalyst 22a, and becomes higher as the catalyst temperature TC becomes higher. That is, the NO ratio difference of the exhaust gas which flows out from the $NO_x$ storage and reduction catalyst 22a becomes further larger than the NO ratio difference of the exhaust gas which flows into the $NO_x$ storage and reduction catalyst 22a, and becomes larger as the catalyst temperature TC becomes higher. Therefore, even if the exhaust gas which flows out from the $NO_x$ storage and reduction catalyst 22a is sent into the selective reduction catalyst 22d as it is, $NO_x$ is liable to be unable to be purified well at the selective reduction catalyst 22d.

Therefore, in this embodiment according to the present disclosure, the NO oxidation catalyst 22b is arranged downstream of the $NO_x$ storage and reduction catalyst 22a to oxidize part of the NO in the exhaust gas which flows into the NO oxidation catalyst 22b to $NO_2$, thereby the NO ratio RNO of the exhaust gas which flows out from the NO oxidation catalyst 22b is made to fall and approach the optimum ratio (0.5) of the selective reduction catalyst 22d.

In this regard, in the present disclosure resulted from intensive research resulting in the following. That is, in a process of the catalyst temperature TC further rising beyond the high temperature side set temperature TCSH, if the catalyst temperature TC is relatively low or right after the catalyst temperature TC exceeds the high temperature side set temperature TCSH, the NO ratio RNO of the exhaust gas which flows out from the $NO_x$ storage and reduction catalyst 22a, that is, the NO ratio RNO of the exhaust gas which flows into the NO oxidation catalyst 22b, becomes higher as the catalyst temperature TC becomes higher, as explained above. In this regard, if the catalyst temperature TC further rises, the NO ratio RNO of the exhaust gas which flows into the NO oxidation catalyst 22b becomes lower as the catalyst temperature TC becomes higher. This is because if the catalyst temperature TC is considerably high, the $NO_2$ in the exhaust gas which flows into the $NO_x$ storage and reduction catalyst 22a becomes harder to be stored in the $NO_x$ storage and reduction catalyst 22a, therefore an amount of NO which is converted from $NO_2$ by the $NO_x$ storage and reduction catalyst 22a becomes small. Further, in general, if the catalyst temperature TC becomes higher, the NO oxidizing ability of the NO oxidation catalyst 22b becomes higher, so if the catalyst temperature TC becomes considerably high, the amount of NO which is oxidized to $NO_2$ in the NO oxidation catalyst 22b becomes greater. In this case, if the NO oxidation catalyst 22b causes the NO ratio RNO of the exhaust gas to fall, the NO ratio RNO of the exhaust gas which flows out from the NO oxidation catalyst 22b is liable to fall below the optimum ratio (0.5) of the selective reduction catalyst 22d and become further from the optimum ratio (0.5).

Therefore, in this embodiment according to the present disclosure, the $NO_2$ reduction catalyst 22c is arranged downstream of the NO oxidation catalyst 22b to reduce part of the $NO_2$ in the exhaust gas which flows into the $NO_2$ reduction catalyst 22c to NO by the $NO_2$ reduction catalyst 22c, thereby the NO ratio RNO of the exhaust gas which flows out from the $NO_2$ reduction catalyst 22c, that is, the NO ratio RNO of the exhaust gas which flows into the selective reduction catalyst 22d is prevented from excessively falling and approaches the optimum ratio (0.5) of the selective reduction catalyst 22d. This will be further explained with reference to FIG. 9.

Figure 9:
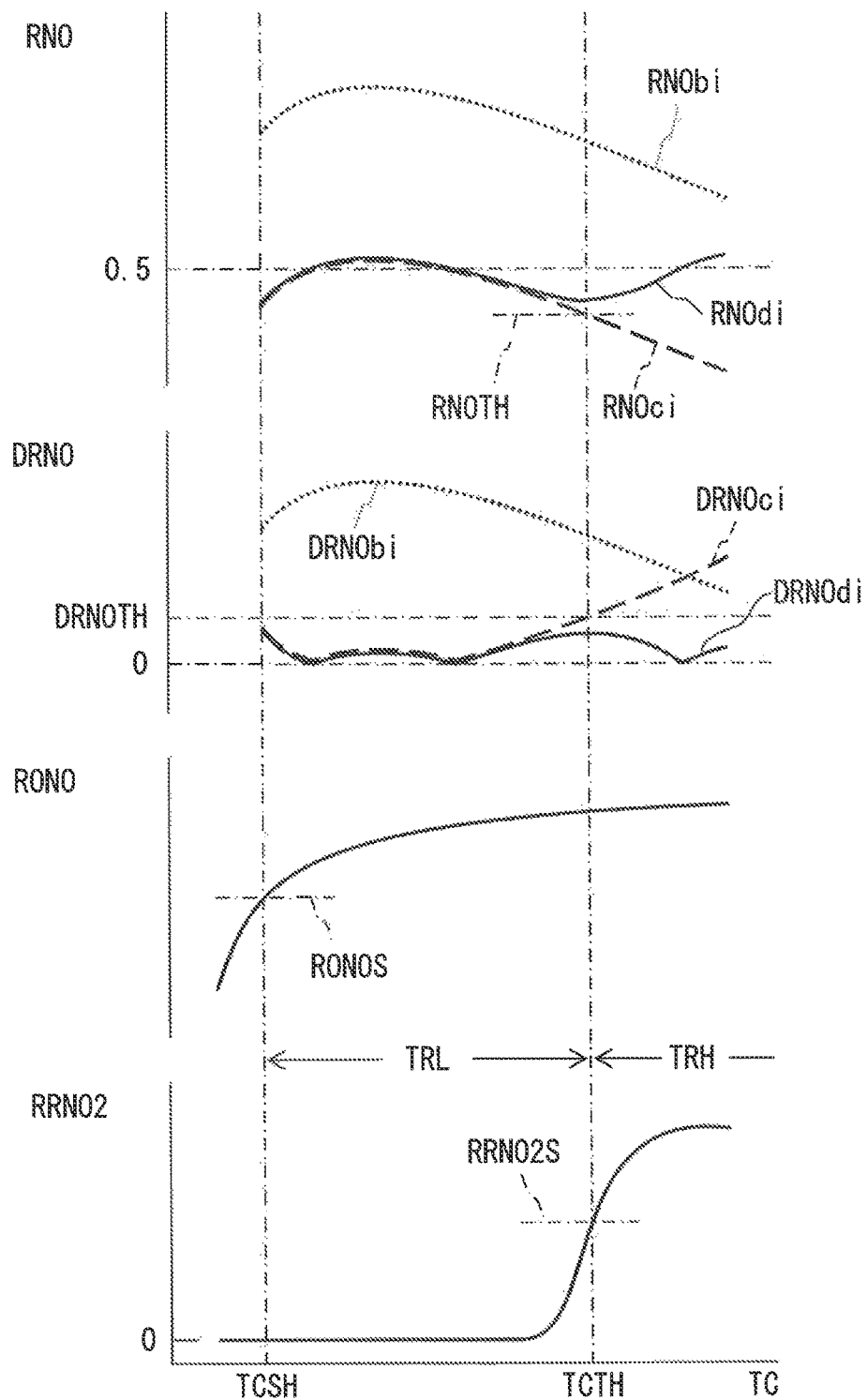
FIG. 9 is a graph which shows a relationship between an NO ratio etc. and a catalyst temperature TC.

FIG. 9 shows a relationship among the NO ratio RNObi and the NO ratio difference DRNObi of the exhaust gas which flows into the NO oxidation catalyst 22b, the NO ratio RNOci and the NO ratio difference DRNOci of the exhaust gas which flows into the $NO_2$ reduction catalyst 22c, and the NO ratio RNOdi and the NO ratio difference DRNOdi of the exhaust gas which flows into the selective reduction catalyst 22d with the catalyst temperature TC.

As shown in FIG. 9, the NO ratio of the exhaust gas which flows out from the $NO_x$ storage and reduction catalyst 22a, that is, the NO ratio RNObi of the exhaust gas which flows into the NO oxidation catalyst 22b, rises as the catalyst temperature TC becomes higher right after the catalyst temperature TC exceeds the high temperature side set temperature TCSH, but if the catalyst temperature TC further rises, it falls as the catalyst temperature TC becomes higher. Further, the NO ratio RNObi is larger than a predetermined threshold NO ratio RNOTH, and a NO ratio difference DRNObi is larger than a predetermined threshold difference DRNOTH(=|RNOTH−0.5|).

The exhaust gas which flows out from the $NO_x$ storage and reduction catalyst 22a next flows into the NO oxidation catalyst 22b. In this embodiment according to the present disclosure, as shown in FIG. 9, an NO oxidation rate RONO which expresses the NO oxidizing ability of the NO oxidation catalyst 22b becomes higher as the catalyst temperature TC becomes higher, and is higher than a predetermined set NO oxidation rate RONOS when the catalyst temperature TC is higher than the high temperature side set temperature TCSH. Note that, if expressing an amount of NO in the exhaust gas which flows into the NO oxidation catalyst 22b as QNObin (mol) and expressing an amount of NO in the exhaust gas which flows out from the NO oxidation catalyst 22b as QNObout (mol), the NO oxidation rate RONO of the NO oxidation catalyst 22b is calculated using the following formula:

RONO=(QNObin−QNObout)/QNObin

As a result, as shown in FIG. 9, the NO ratio of the exhaust gas which flows out from the NO oxidation catalyst 22b, that is, the NO ratio RNOci of the exhaust gas which flows into the $NO_2$ reduction catalyst 22c, becomes lower than the NO ratio RNObi of the exhaust gas which flows into the NO oxidation catalyst 22b, and the NO ratio difference DRNOci of the exhaust gas which flows into the $NO_2$ reduction catalyst 22c becomes smaller than the NO ratio difference DRNObi of the exhaust gas which flows into the NO oxidation catalyst 22b. Specifically, when the catalyst temperature TC is relatively low or right after the catalyst temperature TC exceeds the high temperature side set temperature TCSH, the NO ratio RNOci becomes close to the optimum ratio (0.5) of the selective reduction catalyst 22d and the NO ratio difference DRNOci becomes smaller than the threshold difference DRNOTH. In this regard, if the catalyst temperature TC becomes further higher, the NO ratio RNOci falls below the optimum ratio (0.5) of the selective reduction catalyst 22d. In particular, if the catalyst temperature TC becomes higher than a threshold temperature TCTH, the NO ratio RNOci falls below the threshold NO ratio RNOTH and the NO ratio difference DRNOci increases beyond the threshold difference DRNOTH. This threshold temperature TCTH is for example 400° C.

The exhaust gas which flows out from the NO oxidation catalyst 22b next flows into the $NO_2$ reduction catalyst 22c. In this embodiment according to the present disclosure, an $NO_2$ reduction rate $RRNO_2$, which shows the $NO_2$ reducing ability of the $NO_2$ reduction catalyst 22c, as shown in FIG. 9, is maintained at substantially zero when the catalyst temperature TC is relatively low. If the catalyst temperature TC approaches the threshold temperature TCTH, it becomes higher as the catalyst temperature TC becomes higher. If the catalyst temperature TC is higher than the threshold temperature TCTH, it becomes higher than a predetermined set $NO_2$ reduction rate $RRNO_2S$. Note that, if expressing an amount of $NO_2$ in the exhaust gas which flows into the $NO_2$ reduction catalyst 22c as $QNO_2$cin (mol) and expressing an amount of $NO_2$ in the exhaust gas which flows out from the $NO_2$ reduction catalyst 22c as $QNO_2$cout (mol), the $NO_2$ reduction rate $RRNO_2$ of the $NO_2$ reduction catalyst 22c is calculated using the following formula:

$RRNO_2$=($QNO_2$cin−$QNO_2$cout)/$QNO_2$cin

As a result, as shown in FIG. 9, the NO ratio of the exhaust gas which flows out from the $NO_2$ reduction catalyst 22c, that is, the NO ratio RNOdi of the exhaust gas which flows into the selective reduction catalyst 22d, is maintained closer to the optimum ratio (0.5) of the selective reduction catalyst 22d than the NO ratio RNOci of the exhaust gas which flows into the $NO_2$ reduction catalyst 22c. Specifically, when the catalyst temperature TC is relatively low or right after the catalyst temperature TC exceeds the high temperature side set temperature TCSH, the NO ratio RNOdi becomes substantially equal to the NO ratio RNOci and is maintained close to the optimum ratio (0.5) of the selective reduction catalyst 22d. Further, the NO ratio difference DRNOdi at this time is substantially equal to the NO ratio difference DRNOci and is maintained smaller than the threshold difference DRNOTH. Further, even if the catalyst temperature TC becomes higher than the threshold temperature TCTH, the NO ratio RNOdi does not become smaller than the threshold NO ratio RNOTH, while the NO ratio difference DRNOdi is maintained smaller than the NO ratio difference DRNOci and is maintained smaller than the threshold difference DRNOTH. That is, regardless of the catalyst temperature TC, the NO ratio RNOdi is maintained close to the optimum ratio (0.5) of the selective reduction catalyst 22d and the NO ratio difference DRNOdi is maintained small. Therefore, the selective reduction catalyst 22d can purify the $NO_x$ well.

Note that, in FIG. 9, the NO oxidation rate RONO of the NO oxidation catalyst 22b and the $NO_2$ reduction rate $RRNO_2$ of the $NO_2$ reduction catalyst 22c are respectively shown as functions of the catalyst temperature TC. The catalyst temperature TC, as explained above, is the temperature of the $NO_x$ storage and reduction catalyst 22a or the temperature of the exhaust gas which flows out from the $NO_x$ storage and reduction catalyst 22a, so it does not necessarily correspond to the temperature of the NO oxidation catalyst 22b and the temperature of the $NO_2$ reduction catalyst 22c. Therefore, for example, if considering that a temperature of the $NO_2$ reduction catalyst 22c which may be required for making the $NO_2$ reduction rate $RRNO_2$ of the $NO_2$ reduction catalyst 22c higher than the above-mentioned set $NO_2$ reduction rate $RRNO_2S$ is an activation temperature of the $NO_2$ reduction catalyst 22c, the activation temperature of the $NO_2$ reduction catalyst 22c is not the threshold temperature TCTH, but is a temperature of the $NO_2$ reduction catalyst 22c which is obtained when the temperature TC of the $NO_x$ storage and reduction catalyst 22a is the threshold temperature TCTH. Similarly, an activation temperature of the NO oxidation catalyst 22b is a temperature of the NO oxidation catalyst 22b which is obtained when the temperature TC of the $NO_x$ storage and reduction catalyst 22a is the high temperature side set temperature TCSH.

TRL which is shown in FIG. 9 shows a low temperature range from the high temperature side set temperature TCSH to the threshold temperature TCTH, while TRH shows a high temperature range from the threshold temperature TCTH to a temperature which the $NO_x$ storage and reduction catalyst 22a can take. In the example which is shown in FIG. 9, in the low temperature range TRL, the NO oxidizing ability of the NO oxidation catalyst 22b is set so that the NO oxidation rate RONO of the NO oxidation catalyst 22b is higher, while the $NO_2$ reducing ability of the $NO_2$ reduction catalyst 22c is set so that the $NO_2$ reduction rate $RRNO_2$ of the $NO_2$ reduction catalyst 22c is lower. As a result, in the low temperature range TRL, reduction to $NO_2$ is suppressed while oxidation of NO is promoted, therefore the NO ratio difference DRNOdi of the exhaust gas which flows into the selective reduction catalyst 22d is made smaller. On the other hand, in the high temperature range TRH, the $NO_2$ reducing ability of the $NO_2$ reduction catalyst 22c is set so that the $NO_2$ reduction rate $RRNO_2$ of the $NO_2$ reduction catalyst 22c is higher. As a result, in the high temperature range TRH, reduction to $NO_2$ is promoted, therefore the NO ratio difference DRNOdi of the exhaust gas which flows into the selective reduction catalyst 22d is made smaller. Note that the NO oxidizing ability of the NO oxidation catalyst 22b is set and the $NO_2$ reducing ability of the $NO_2$ reduction catalyst 22c is set, for example, by selecting at least one of a type of catalyst ingredient, an amount of the catalyst ingredient which is carried on a carrier or substrate per unit volume, and a surface area of the catalyst ingredient or carrier.

Figure 10:
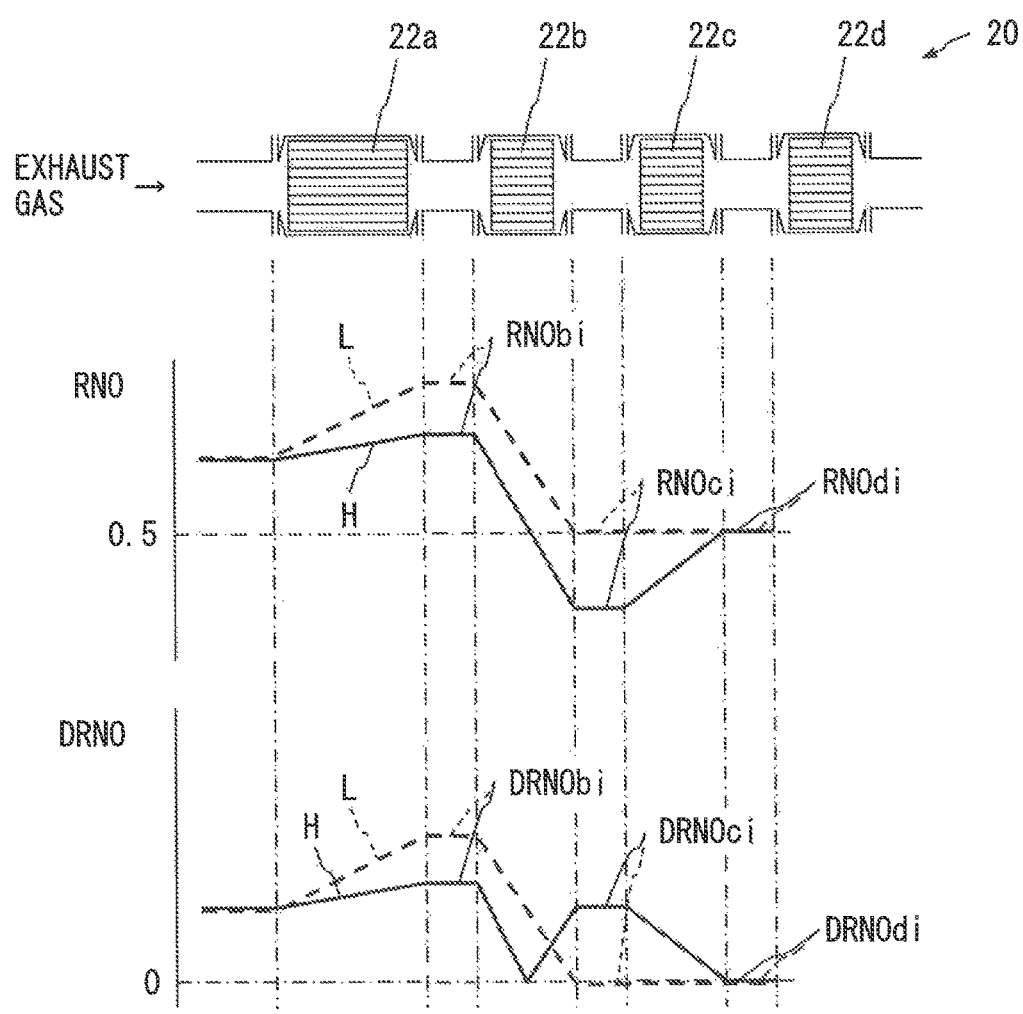
FIG. 10 is a graph which shows a relationship between an NO ratio etc. and a position in an exhaust passage.

FIG. 10 shows one example of the NO ratio RNO and the NO ratio difference DRNO of the exhaust gas when the catalyst temperature TC is in the low temperature range TRL by "L", while one example of the NO ratio RNO and the NO ratio difference DRNO of the exhaust gas when the catalyst temperature TC is in the high temperature range TRH by "H".

In the example which is shown in FIG. 10, the NO ratio RNO when the catalyst temperature TC is within the low temperature range TRL is made to rise by the $NO_x$ storage and reduction catalyst 22a to become RNObi, is made to fall by the NO oxidation catalyst 22b to become RNOci, and is maintained by the $NO_2$ reduction catalyst 22c to become RNOdi. Therefore, the NO ratio difference DRNO when the catalyst temperature TC is within the low temperature range TRL is increased by the $NO_x$ storage and reduction catalyst 22a to become DRNObi, is decreased by the NO oxidation catalyst 22b to become DRNOci, and is maintained by the $NO_2$ reduction catalyst 22c to become DRNOdi.

On the other hand, the NO ratio RNO when the catalyst temperature TC is within the high temperature range TRH is made to rise by the $NO_x$ storage and reduction catalyst 22a to become RNObi, is made to fall by the NO oxidation catalyst 22b to become RNOci, and is made to rise by the $NO_2$ reduction catalyst 22c to become RNOdi. Therefore, the NO ratio difference DRNO when the catalyst temperature TC is within the high temperature range TRH is increased by the $NO_x$ storage and reduction catalyst 22a to become DRNObi, is decreased by the NO oxidation catalyst 22b to become DRNOci, and is decreased by the $NO_2$ reduction catalyst 22c to become DRNOdi. Note that the NO ratio difference DRNO is sometimes increased or maintained by the NO oxidation catalyst 22b.

In accordance with the above, when the catalyst temperature TC is both in the low temperature range TRL and in the high temperature range TRH, the NO ratio difference DRNOdi of the exhaust gas which flows into the selective reduction catalyst 22d is made equal to or smaller than the NO ratio difference DRNObi of the exhaust gas which flows into the NO oxidation catalyst 22b by the NO oxidation catalyst 22b and $NO_2$ reduction catalyst 22c. Further, when the catalyst temperature TC is both in the low temperature range TRL and in the high temperature range TRH, the NO ratio difference DRNOdi of the exhaust gas which flows into the selective reduction catalyst 22d is made equal to or smaller the NO ratio difference DRNOci of the exhaust gas which flows into the $NO_2$ reduction catalyst 22c by the $NO_2$ reduction catalyst 22c.

Therefore, conceptually speaking, the NO oxidizing ability of the NO oxidation catalyst 22b and the $NO_2$ reducing ability of the $NO_2$ reduction catalyst 22c are respectively set so that the NO ratio difference DRNOdi of the exhaust gas which flows into the selective reduction catalyst 22d is equal to or smaller than the NO ratio difference DRNObi of the exhaust gas which flows into the NO oxidation catalyst 22b. Alternatively, the $NO_2$ reducing ability of the $NO_2$ reduction catalyst 22c is set so that the NO ratio difference DRNOdi of the exhaust gas which flows into the selective reduction catalyst 22d is equal to or smaller than the NO ratio difference DRNOci of the exhaust gas which flows into the $NO_2$ reduction catalyst 22c.

Furthermore, when the catalyst temperature TC rises over a predetermined set temperature, the air-fuel ratio AFE of the exhaust gas which flows into the $NO_x$ storage and reduction catalyst 22a is temporarily switched to the rich air-fuel ratio AFRA which is adapted for generating ammonia from the $NO_x$ which is stored in the $NO_x$ storage and reduction catalyst 22a. When the catalyst temperature TC is higher than the set temperature, the $NO_x$ in the exhaust gas which flows into the selective reduction catalyst 22d is reduced by the ammonia. Based on the above, the NO oxidizing ability of the NO oxidation catalyst 22b and the $NO_2$ reducing ability of the $NO_2$ reduction catalyst 22c are respectively set so that, when the catalyst temperature TC is higher than the set temperature, the NO ratio difference DRNOdi of the exhaust gas which flows into the selective reduction catalyst 22d is equal to or smaller than the NO ratio difference DRNObi of the exhaust gas which flows into the NO oxidation catalyst 22b. Alternatively, the $NO_2$ reducing ability of the $NO_2$ reduction catalyst 22c is set so that, when the catalyst temperature TC is higher than the set temperature, the NO ratio difference DRNOdi of the exhaust gas which flows into the selective reduction catalyst 22d is equal to or smaller than the NO ratio difference DRNOci of the exhaust gas which flows into the $NO_2$ reduction catalyst 22c.

Furthermore, after the air-fuel ratio AFE of the exhaust gas which flows into the $NO_x$ storage and reduction catalyst 22a is temporarily switched to the rich air-fuel ratio AFRA which is adapted for generating ammonia from the $NO_x$ which is stored in the $NO_x$ storage and reduction catalyst 22a, the air-fuel ratio AFE of the exhaust gas which flows into the $NO_x$ storage and reduction catalyst 22a is maintained lean until the catalyst temperature TC becomes lower than the set temperature. On the other hand, when the catalyst temperature TC is lower than the set temperature, the air-fuel ratio AFE of the exhaust gas which flows into the $NO_x$ storage and reduction catalyst 22a is temporarily switched to the rich air-fuel ratio AFRN which is adapted for reducing the $NO_x$ which is stored in the $NO_x$ storage and reduction catalyst 22a to $N_2$.

The above-mentioned set temperature is set higher than a temperature at which the $NO_x$ purification rate RPNOXa of the $NO_x$ storage and reduction catalyst 22a reaches the peak value RPNOXa, that is, the peak temperature TCP. In this already explained embodiment according to the present disclosure, the set temperature is set to the high temperature side set temperature TCSH.

Furthermore, the $NO_2$ reducing ability of the $NO_2$ reduction catalyst 22c is set so that, when the catalyst temperature TC is in a temperature range lower where the NO ratio RNOci of the exhaust gas which flows into the $NO_2$ reduction catalyst 22c is lower than a predetermined threshold NO ratio RNOTH, that is, when the catalyst temperature TC is in the high temperature range TRH, the $NO_2$ reduction rate $RRNO_2$ of the $NO_2$ reduction catalyst 22c is higher than the predetermined set $NO_2$ reduction rate $RRNO_2S$.

Note that, if setting the NO oxidizing ability of the NO oxidation catalyst 22b low, the NO ratio RNOdi of the exhaust gas which flows into the selective reduction catalyst 22d possibly can be prevented from falling below the threshold NO ratio RNOTH when the catalyst temperature TC is in the high temperature range TRH. However, if setting the NO oxidizing ability of the NO oxidation catalyst 22b low, the NO in the exhaust gas is liable to be unable to be sufficiently oxidized to $NO_2$ when the catalyst temperature TC is in the low temperature range TRL. In this embodiment according to the present disclosure, the NO oxidizing ability of the NO oxidation catalyst 22b and $NO_2$ reducing ability of the $NO_2$ reduction catalyst 22c are set so that NO is reliably oxidized to $NO_2$ in the low temperature range TRL while $NO_2$ is reliably reduced to NO in the high temperature range TRH.

Figure 11:
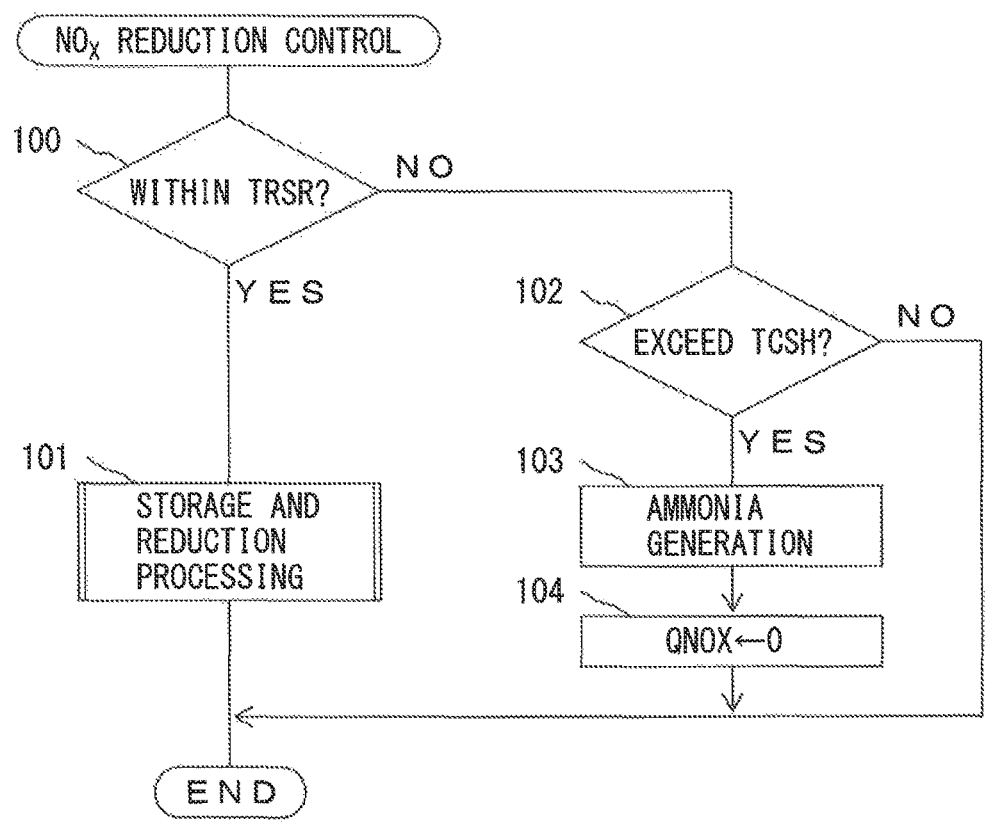
FIG. 11 is a flow chart which shows an $NO_x$ reduction control routine.

FIG. 11 shows a routine which performs the $NO_x$ reduction control of this embodiment according to the present disclosure. This routine is performed by interruption every certain time period.

Referring to FIG. 11, at step 100, it is judged if the catalyst temperature TC is in the storage and reduction temperature range TRSR. If the catalyst temperature TC is in the storage and reduction temperature range TRSR (TCSL≤TC≤TCSH), next the routine proceeds to step 101 where a storage and reduction processing routine is performed. This storage and reduction processing routine is shown in FIG. 12.

Figure 12:
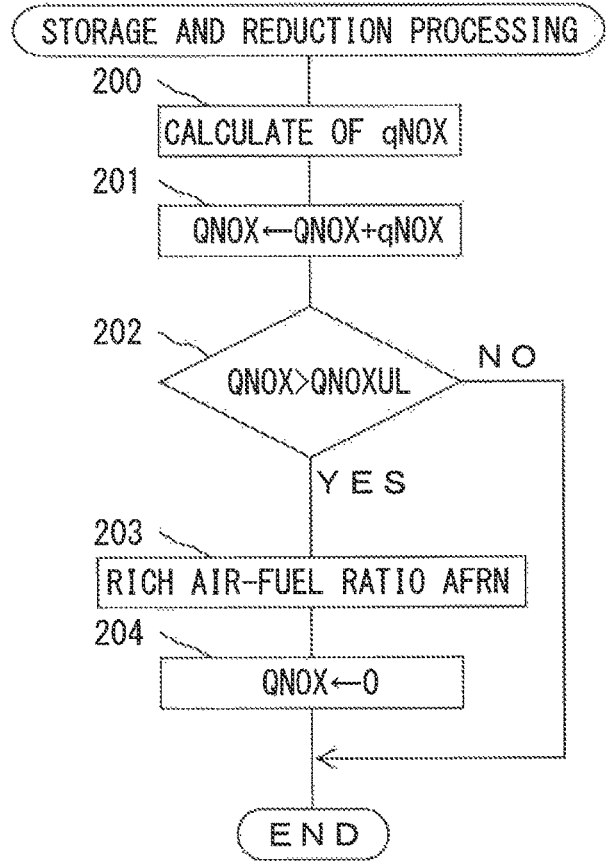
FIG. 12 is a flow chart which shows a storage and reduction processing routine.

Referring to FIG. 12 which shows the storage and reduction processing routine, at step 200, the $NO_x$ amount qNOX which is stored in the $NO_x$ storage and reduction catalyst 22a per unit time is calculated by using the map of FIG. 5. At the next step 201, the $NO_x$ storage amount QNOX of the $NO_x$ storage and reduction catalyst 22a is renewed (QNOX=QNOX+qNOX). At the next step 202, it is judged if the $NO_x$ storage amount QNOX is greater than the upper limit amount QNOXUL. If QNOX≤QNOXUL, the processing cycle is ended. If QNOX>QNOXUL, the routine advances from step 202 to step 203 where the air-fuel ratio AFE of the exhaust gas which flows into the $NO_x$ storage and reduction catalyst 22a is temporarily switched to the rich air-fuel ratio AFRN adapted for reducing $NO_x$ to $N_2$. At the next step 204, the $NO_x$ storage amount QNOX is returned to zero.

Referring again to FIG. 11, if the catalyst temperature TC is not within the storage and reduction temperature range TRSR (TC<TCSL, TCSH<TC), the routine proceeds from step 100 to step 102 where it is judged if the catalyst temperature TC has risen beyond the high temperature side set temperature TCSH. If the catalyst temperature TC has not risen beyond the high temperature side set temperature TCSH, that is, if the catalyst temperature TC is lower than the high temperature side set temperature TCSH or is maintained higher than the high temperature side set temperature TCSH, the processing cycle is ended. If the catalyst temperature TC rises over the high temperature side set temperature TCSH, next, the routine proceeds to step 103 where the air-fuel ratio AFE of the exhaust gas which flows into the $NO_x$ storage and reduction catalyst 22a is temporarily switched to the rich air-fuel ratio AFRA adapted for producing ammonia from the $NO_x$ which is stored in the $NO_x$ storage and reduction catalyst 22a. At the next step 104, the $NO_x$ storage amount QNOX of the $NO_x$ storage and reduction catalyst 22a is returned to zero.

Figure 13:
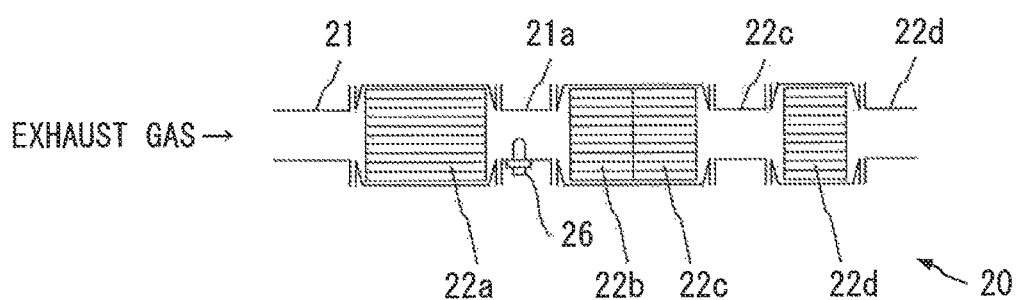
FIG. 13 is a view which shows another embodiment of an exhaust post-treatment device.

In the foregoing embodiments, the NO oxidation catalyst 22b and $NO_2$ reduction catalyst 22c were carried on the substrates different from each other. As opposed to this, in another embodiment which is shown in FIG. 13, the NO oxidation catalyst 22b and $NO_2$ reduction catalyst 22c are arranged on a substrate common to each other and are housed in a common casing. Further, in still another embodiment (not shown), the $NO_x$ storage and reduction catalyst 22a is carried on a particulate filter which traps particulate matter in the exhaust gas.

While the disclosure has been described by reference to specific embodiments chosen for purposes of illustration, it should be apparent that numerous modifications could be made thereto, by those skilled in the art, without departing from the basic concept and scope of the disclosure.

What is claimed is:

1. An exhaust purification system for an internal combustion engine where combustion is performed under an excess of air, the exhaust purification system comprising:
   an $NO_x$ storage and reduction catalyst which is arranged in an engine exhaust passage, the $NO_x$ storage and reduction catalyst being configured to:
      store $NO_x$ when an air-fuel ratio of exhaust gas which flows into said $NO_x$ storage and reduction catalyst is lean, and
      release stored $NO_x$ and reduce the released $NO_x$ to $N_2$ or ammonia when the air-fuel ratio of the exhaust gas which flows into said $NO_x$ storage and reduction catalyst becomes rich;
   an NO oxidation catalyst which is arranged downstream of said $NO_x$ storage and reduction catalyst in the engine exhaust passage, the NO oxidation catalyst being configured to oxidize part of NO in the exhaust gas which flows into said NO oxidation catalyst to $NO_2$;
   an $NO_2$ reduction catalyst which is arranged downstream of said NO oxidation catalyst in the engine exhaust passage, the $NO_2$ reduction catalyst being configured to reduce part of the $NO_2$ in the exhaust gas which flows into said $NO_2$ reduction catalyst to NO under an oxidizing atmosphere;

a selective reduction catalyst which is arranged downstream of said $NO_2$ reduction catalyst in the engine exhaust passage, the selective reduction catalyst being configured to:
hold ammonia in the exhaust gas which flows into said selective reduction catalyst, and
selectively reduce $NO_x$ in the exhaust gas which flows into said selective reduction catalyst by said ammonia under an oxidizing atmosphere; and
a controller which is configured to temporarily switch the air-fuel ratio of the exhaust gas which flows into said $NO_x$ storage and reduction catalyst to a rich air-fuel ratio which is adapted for producing ammonia from $NO_x$ which is stored in said $NO_x$ storage and reduction catalyst,
wherein the ammonia which is produced by said $NO_x$ storage and reduction catalyst is held by said selective reduction catalyst, and the $NO_x$ in the exhaust gas which flows into said selective reduction catalyst is reduced by said ammonia after the air-fuel ratio of the exhaust gas which flows into said $NO_x$ storage and reduction catalyst is returned to lean.

2. The exhaust purification system for an internal combustion engine according to claim 1, wherein an NO oxidizing ability of said NO oxidation catalyst and an $NO_2$ reducing ability of said $NO_2$ reduction catalyst are respectively set so that an NO ratio difference of exhaust gas which flows into said selective reduction catalyst is equal to or smaller than an NO ratio difference of exhaust gas which flows into said NO oxidation catalyst, the NO ratio difference of exhaust gas which flows into said selective reduction catalyst being an absolute value of a difference of NO ratio of exhaust gas which flows into said selective reduction catalyst to an optimum ratio of said selective reduction catalyst, and the NO ratio difference of exhaust gas which flows into said NO oxidation catalyst being an absolute value of a difference of NO ratio of exhaust gas which flows into said NO oxidation catalyst to said optimum ratio.

3. The exhaust purification system for an internal combustion engine according to claim 1, wherein an $NO_2$ reducing ability of said $NO_2$ reduction catalyst is set so that an NO ratio difference of exhaust gas which flows into said selective reduction catalyst is equal to or smaller than an NO ratio difference of exhaust gas which flows into said $NO_2$ reduction catalyst, the NO ratio difference of exhaust gas which flows into said selective reduction catalyst being an absolute value of a difference of NO ratio of exhaust gas which flows into said selective reduction catalyst to an optimum ratio of said selective reduction catalyst, and the NO ratio difference of exhaust gas which flows into said $NO_2$ reduction catalyst being an absolute value of a difference of NO ratio of exhaust gas which flows into said $NO_2$ reduction catalyst to said optimum ratio.

4. The exhaust purification system for an internal combustion engine according to claim 1, wherein said controller is configured to temporarily switch the air-fuel ratio of exhaust gas which flows into said $NO_x$ storage and reduction catalyst to the rich air-fuel ratio which is adapted for producing ammonia from the $NO_x$ which is stored in said $NO_x$ storage and reduction catalyst when a temperature of said $NO_x$ storage and reduction catalyst exceeds a predetermined set temperature, whereby the $NO_x$ in the exhaust gas which flows into said selective reduction catalyst is reduced by said ammonia when the temperature of said $NO_x$ storage and reduction catalyst is higher than said set temperature.

5. The exhaust purification system for an internal combustion engine according to claim 4, wherein an NO oxidizing ability of said NO oxidation catalyst and an $NO_2$ reducing ability of said $NO_2$ reduction catalyst are respectively set so that an NO ratio difference of exhaust gas which flows into said selective reduction catalyst is equal to or smaller than an NO ratio difference of exhaust gas which flows into said NO oxidation catalyst when the temperature of said $NO_x$ storage and reduction catalyst is higher than said set temperature, the NO ratio difference of exhaust gas which flows into said selective reduction catalyst being an absolute value of a difference of NO ratio of exhaust gas which flows into said selective reduction catalyst to an optimum ratio of said selective reduction catalyst, and the NO ratio difference of exhaust gas which flows into said NO oxidation catalyst being an absolute value of a difference of NO ratio of exhaust gas which flows into said NO oxidation catalyst to said optimum ratio.

6. The exhaust purification system for an internal combustion engine according to claim 4, wherein an $NO_2$ reducing ability of said $NO_2$ reduction catalyst is set so that an NO ratio difference of exhaust gas which flows into said selective reduction catalyst is equal to or smaller than an NO ratio difference of exhaust gas which flows into said $NO_2$ reduction catalyst when the temperature of said $NO_x$ storage and reduction catalyst is higher than said set temperature, the NO ratio difference of exhaust gas which flows into said selective reduction catalyst being an absolute value of a difference of NO ratio of exhaust gas which flows into said selective reduction catalyst to an optimum ratio of said selective reduction catalyst, and the NO ratio difference of exhaust gas which flows into said $NO_2$ reduction catalyst being an absolute value of a difference of NO ratio of exhaust gas which flows into said $NO_2$ reduction catalyst to said optimum ratio.

7. The exhaust purification system for an internal combustion engine according to claim 4, wherein said controller is configured to maintain the air-fuel ratio of exhaust gas which flows into said $NO_x$ storage and reduction catalyst lean after temporarily switching the air-fuel ratio of exhaust gas which flows into said $NO_x$ storage and reduction catalyst to the rich air-fuel ratio which is adapted for generating ammonia from the $NO_x$ which is stored in said $NO_x$ storage and reduction catalyst until the temperature of said $NO_x$ storage and reduction catalyst becomes lower than said set temperature.

8. The exhaust purification system for an internal combustion engine according to claim 4, wherein said controller is configured to temporarily switch the air-fuel ratio of the exhaust gas which flows into said $NO_x$ storage and reduction catalyst to a rich air-fuel ratio which is adapted for reducing the $NO_x$ which is stored in said $NO_x$ storage and reduction catalyst to $N_2$ when the temperature of said $NO_x$ storage and reduction catalyst is lower than said set temperature.

9. The exhaust purification system for an internal combustion engine according to claim 4, wherein said $NO_x$ storage and reduction catalyst is configured to have an $NO_x$ purification rate rises, reaches a peak value, and then falls, along with the temperature of said $NO_x$ storage and reduction catalyst becoming higher when the air-fuel ratio of exhaust gas which flows into said $NO_x$ storage and reduction catalyst is temporarily switched to the rich air-fuel ratio which is adapted for reducing the $NO_x$ which is stored in said $NO_x$ storage and reduction catalyst to $N_2$, and wherein said set temperature is set to a temperature higher than the temperature at which the $NO_x$ purification rate of said $NO_x$ storage and reduction catalyst reaches said peak value.

10. The exhaust purification system for an internal combustion engine according to claim 1, wherein an $NO_2$ reducing ability of said $NO_2$ reduction catalyst is set so that an $NO_2$ reduction rate of said $NO_2$ reduction catalyst is higher than a predetermined set $NO_2$ reduction rate in a temperature range where an NO ratio of the exhaust gas which flows into said $NO_2$ reduction catalyst is lower than a predetermined threshold NO rate.

11. The exhaust purification system for an internal combustion engine according to claim 1, wherein said $NO_2$ reduction catalyst contains potassium or lithium.

12. The exhaust purification system for an internal combustion engine according to claim 1, wherein said NO oxidation catalyst and said $NO_2$ reduction catalyst are carried on a common substrate.

\* \* \* \* \*